US00RE34970E

United States Patent [19]

Tittgemeyer

[11] E Patent Number: Re. 34,970

[45] Reissued Date of Patent: Jun. 20, 1995

[54] METHOD AND APPARATUS FOR PRINTING WITH A LITHOGRAPHIC SLEEVE

[75] Inventor: Udo Tittgemeyer, Arnsberg, Germany

[73] Assignee: Tittgemeyer Engineering GmbH, Germany

[21] Appl. No.: 862,704

[22] Filed: Apr. 3, 1992

Related U.S. Patent Documents

Reissue of:

[64] Patent No.: 4,913,048
Issued: Apr. 3, 1990
Appl. No.: 293,589
Filed: Jan. 3, 1989

U.S. Applications:

[63] Continuation of Ser. No. 940,438, Dec. 11, 1986, abandoned.

[30] Foreign Application Priority Data

Dec. 11, 1985 [DE] Germany ..... 35 43 704.9

[51] Int. Cl.[6] ..... B41F 7/20

[52] U.S. Cl. ..... 101/141; 101/451; 101/216; 101/375

[58] Field of Search ..... 101/217, 218, 216, 220, 101/137, 142, 143, 144, 375, 376, 219, 141

[56] References Cited

U.S. PATENT DOCUMENTS

| | | | |
|---|---|---|---|
| 637,562 | 11/1899 | Hett | 101/140 |
| 1,608,206 | 11/1926 | Freedlander | 101/217 X |
| 1,804,139 | 5/1931 | Adsit et al. | 101/217 |
| 2,054,620 | 9/1936 | Freedlander | 101/217 |
| 2,315,729 | 4/1943 | Nunnally | 101/375 |
| 2,460,504 | 2/1949 | Huebner | 101/216 X |
| 2,721,601 | 10/1955 | Spencer | 101/375 X |
| 2,782,712 | 2/1957 | Claff et al. | 101/144 |
| 2,925,037 | 2/1960 | Fischer | 101/216 |
| 3,136,672 | 6/1964 | Prongay | 101/375 |
| 3,146,709 | 9/1964 | Bass et al. | 101/375 |
| 3,166,013 | 1/1965 | Wyllie et al. | 101/378 |
| 3,203,346 | 8/1965 | Norton et al. | 101/142 X |
| 3,280,736 | 10/1966 | Schafler et al. | 101/459 |
| 3,413,921 | 12/1968 | Boatman | 101/248 |
| 4,111,120 | 9/1978 | Paulson | 101/175 |
| 4,119,032 | 10/1978 | Hollis | 101/375 X |
| 4,381,709 | 5/1983 | Katz | 101/375 |
| 4,643,090 | 2/1987 | McKrell et al. | 101/220 X |

FOREIGN PATENT DOCUMENTS

| | | | |
|---|---|---|---|
| 0076777 | 4/1983 | European Pat. Off. . | |
| 228483 | 4/1909 | Germany . | |
| 282136 | 2/1915 | Germany | 101/216 |
| 470994 | 5/1927 | Germany . | |
| 490994 | 8/1927 | Germany . | |
| 493693 | 5/1928 | Germany . | |
| 470937 | 2/1929 | Germany | 101/375 |
| 897107 | 4/1942 | Germany . | |
| 39744 | 10/1969 | Germany | 101/216 |
| 2700118 | 7/1977 | Germany . | |
| 2708689 | 9/1977 | Germany . | |
| 107841 | 7/1982 | Japan | 101/375 |
| 300964 | 11/1954 | Switzerland . | |
| 345023 | 4/1960 | Switzerland . | |
| 646377 | 11/1984 | Switzerland . | |
| 710906 | 6/1954 | United Kingdom | 101/216 |
| 763639 | 12/1956 | United Kingdom . | |
| 2015929 | 9/1979 | United Kingdom . | |

*Primary Examiner*—Chris A. Bennett
*Attorney, Agent, or Firm*—Robert J. Koch; Peter J. Davis

[57] ABSTRACT

A printing method and apparatus which use a sleeve-shaped printing form attached to a rotating body. The sleeve-shaped form conveniently permits the printing operation to be performed continuously and on both sides of the print career simultaneously. The sleeves preferably exhibit a number of process-specific functional layers. Exemplary layers are: (1) a supporting metal sleeve, (2) an intermediate metal layer for carrying the ink, and (3) a surface metal layer for carrying the water. Copper is an exemplary intermediate layer, and chromium is used as the surface metal layer.

27 Claims, 5 Drawing Sheets

METHOD AND APPARATUS FOR PRINTING WITH A LITHOGRAPHIC SLEEVE

Matter enclosed in heavy brackets [ ] appears in the original patent but forms no part of this reissue specification; matter printed in italics indicates the additions made by reissue.

This application is a continuation of application Ser. No. 940,438 filed Dec. 11. 1986, now abandoned.

BACKGROUND OF THE INVENTION

1. Field of the Invention

The invention relates to a process and apparatus for printing of print carriers and, more particularly, a rotating body supported in rotating fashion with a printing form, mounted on a body surface facing a print carrier and supported on a stand. The invention particularly relates to printing on print carriers in an offset printing machine with one or more printing units, each comprising a printing form and a transfer cylinder, together with a dampening system and an inking system, wherein the printing form is provided with process specific functional layers. i.e. one water and one ink absorbing layer.

2. Description of the Related Technology

In offset printing processes, plates mounted on carrier cylinders fixedly installed in a printing unit are used. Clamping segments extended through the carrier cylinder are used to mount the plates. The plates begin and end within the extent of these clamping segments, accordingly the print carrier location corresponding to an end or a beginning of the printing form is recognizable. It has not previously been possible to produce endless images with printing forms of this type due to the configuration of the printing form. Furthermore, this layout permits only relatively low rotating velocities. The carrier cylinder did not have a symmetrical or balanced configuration. High vibratory stresses arc generated in the printing unit by operation of unbalanced cylinders. The unsymmetrical shape of carrier cylinders limits the permissible web widths. In addition, the carrier cylinders were heavy and required very carefully designed bearing supports in the printing units. The machines were therefore expensive.

For endless printing heretofore only gravure printing and the flexoprint process could be used. The flexoprint method only enabled small, narrow formats to be printed in small volumes and with an inferior quality. The gravure process requires smooth, flat print careers. In numerous cases the gravure printing process is not optimally suited for applications involving the production of high quality endless prints. In particular, the gravure process is not applicable to the printing or laminated papers, wallpapers and gift wrappings. Furthermore, the gravure process is very expensive and time consuming with respect to the preparation of the printing forms required, as the printing forms must be inserted directly into a gravure cylinder. The expensive gravure cylinders must be available in adequately equipped printing establishments in relatively large numbers.

SUMMARY OF THE INVENTION

It is an object of the invention to provide an improved printing process to enable rapid production of endless prints exhibiting large widths and at an acceptable cost.

This object is attained according to the invention by providing a sleeve shaped printing form mounted on a rotating body or cylinder. The cylinder may be arranged so that one of its end may be accessed so that the sleeve may be slid over the accessible end onto the surface of the rotating printing body and fastened thereto.

According to the invention the offset printing forms and the transfer cylinder covers are prepared in the form of sleeves, slid onto the form and transfer cylinders and fastened thereto in a replaceable manner. The printing form sleeves are replaced in case of a change in the printed image. The invention advantageously exhibits a printing form releasable from a cylinder as in offset printing and enables printing web shaped printing carriers with endless images of large widths at relatively high rotational speeds of the cylinder and thus of the printing forms. The rate of revolution may, for example, be up to 1000 rpm. Additionally, the process enables printing on endless print carriers with relatively high rotating body velocities and thus print carrier velocity. In contrast to conventional gravure printing, printing shops equipped with apparatus according to the invention do not need a large collection of gravure cylinders. Rather, they only need a plurality of different sleeves which may be mounted on a single rotating body. In view of their light weight, even larger formats may be manipulated manually.

Mounting the sleeves does not require a massive rotating body, such as heavy printing cylinders with clamping channels. Rather, relatively light rotating bodies such as cylinder jackets may be used. These light rotating bodies or cylindrical jackets can be accelerated rapidly to high rotating velocities, without danger of introducing unacceptable vibratory stresses to the printing machine stand due to balance deviations. Rotating bodies with this configuration may be produced in large widths, without the risk of excessively increasing rotating body weight technically and economically preventing high speed operation.

A further great advantage of this process, in contrast to gravure printing and flexoprint, is the capability of printing on both sides of the print carrier.

Furthermore, cylinders of different widths and diameters may be used, so that the prints are format variable within wide limits.

Finally, the printing machines according to the invention may be used alternatively for several direct or indirect printing processes. For example, indirect printing such as offset and letter set printing may be carried out by appropriate replacement of sleeves or optionally of the cylinder jacket.

The invention further relates to an apparatus for printing on print careers with at least one printing form mounted on a surface of a rotating body facing the print carrier. The rotating body is supported in rotation around a rotating axle in a stand. The invention is particularly advantageous for printing of print carriers in an offset printing machine with one or more printing unit, each of which comprises a printing form, a transfer cylinder with a damping or wetting unit, and an inking unit.

It has been possible to print only relatively narrow and short formats at relatively low printing velocities with prior systems. Additionally, prior machines were not capable of printing on both sides of a print carriers. It was necessary to clamp the printing form onto the rotating body at a certain location, whereby said body acquired an unsymmetrical circumference. As the result of this unsymmetrical circumference, significant vibratory stresses were introduced into the stand of the printing machine so that in particular in offset printing, only relatively low printing rates could be used. Furthermore, only a relatively small format of the print carrier could be printed.

A further object of the invention is an apparatus that can produce endless prints at relatively high printing velocities with printing forms having large working widths and dimensions. This object is attained according to the invention by a printing form with a sleeve-like configuration fixedly adhered to a rotating body and exhibiting a surface pattern for advantageously transferring ink to a transfer cylinder.

An apparatus according to the invention possesses a large number of advantages resulting from the sleeve print form replaceably mounted on the rotating body. The sleeve may be used in offset printing as the printing form, if its surface is prepared according to the process.

The apparatus is widely applicable in a flexible manner to various printing techniques. It opens particularly in the offset printing process certain entirely novel and new possibilities. It is now feasible to print webs with endless images by this process. Heretofore in rotating body printing methods, printing forms clamped onto the surface of a cylinder were used. Clamping was effected by means of clamping strips extending parallel to the axis of the cylinder throughout its surface, so that the clamping strips were marking the onset and the end of the printing form. No endless images could therefore be printed by this process. The prior application also required very heavy printing cylinders for mounting the clamping channels and to reduce the resultant vibrations, to which the printing forms were attached. These printing cylinders were characterized by appreciable unbalances due to the clamping strips present on the surface of the printing cylinders which, especially under high velocity rotation conditions, affected the stand by inducing vibratory stresses. These vibratory stresses limited the speeds attainable by the printing cylinders to a relatively low level. In contrast, sleeves mounted on a light rotating body may be fastened so that no unbalances are created. Even at high rotating velocities there is no danger of vibratory stresses.

The use of sleeve-shaped print forms enables rotating body printing operations with large operating widths. The circumference of the print body may also extensively increase a great deal without operational restrictions. The rotating body is preferably made of light, high strength materials. The cylinders should be made of a light high strength material in a tubular shape. Suitable materials combining light weight with high mechanical strength and bending rigidity are carbon fiber materials, silicon carbide and beryllium.

The apparatus may be suitably arranged for printing on both sides of a print carrier. In this manner, entirely new fields of application are opened up for the processes.

Further details of the invention will be apparent from the description below with reference to the drawings attached hereto, wherein preferred embodiments of the invention are shown as examples.

BRIEF DESCRIPTION OF THE DRAWINGS

In the drawings.

5

DETAILED DESCRIPTION OF THE PREFERRED EMBODIMENT

An offset printing machine is made up of a frame, at least one printing mechanism with one or more printing units are mounted in stands. Each printing unit is equipped with a print form cylinder, a transfer cylinder and a counter pressure cylinder, supported rotatingly on [journals.] *supports, for example, journals, displaceable journals, pivoting journals, displaceable pressure pieces, pivoting mounts, bearing mounts, support bearings, mounting bearings or bearing supports.* A gear mechanism is connected with the journals to transfer a rotating motion produced by a drive to the cylinders. A printing gap is provided, between the transfer cylinder and the counter pressure cylinder, through which a print carrier moves. In the course of its motion, the print carrier comes into direct contact with both the transfer cylinder and the counter pressure cylinder. In the process, patterns mounted on the surface of the cylinder facing the transfer cylinder are reproduced. The patterns are inked with a printing ink by an inking mechanism distributing ink over the surface of the print cylinder. Prior to the application of the ink, the print form is wetted by a damping unit.

In an indirect printing process a transfer cylinder having a yielding surface is bearingly supported in the stands between the print form cylinder and a counter pressure cylinder. The transfer cylinder has a flexible surface layer, such as for example rubber. The rubber may be in the form of a replaceable sleeve. The ink is transferred onto the rubber by the patterned cylinder and then transferred from the flexible surface to the print carrier by the transfer cylinder. The print carrier may advantageously be a web.

Figure 1:
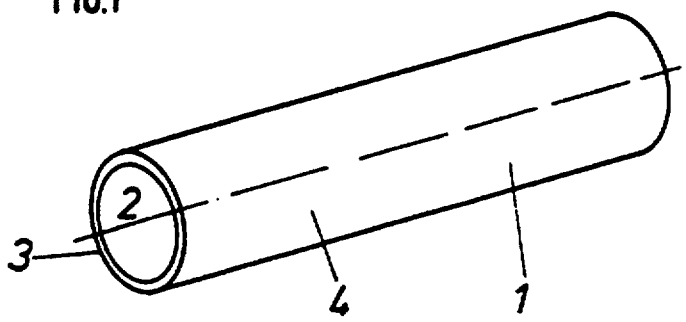
FIG. 1 shows a perspective view of a composite metal sleeve.

FIG. 1 shows in a perspective view a composite metal sleeve 1 exhibiting process specific functional layers including a water and an ink absorbing or retaining layer. The sleeve 1 comprises a supporting metal sleeve 2, to which an intermediate metal 3 and a surface metal 4 are applied. The supporting metal sleeve 2 may advantageously be 0.3 mm thick and has, as indicated by its name, a supporting function. A copper layer with a thickness of approximately 2 to 6 microns is provided as the intermediate metal 3. The thickness is usual for offset printing plates. The surface metal 4 is chromium with a thickness of approximately 1 to 2 microns. If the sleeve is prepared for printing as shown in FIG. 2 the copper carries the ink and the chromium the water.

As another embodiment, a light sensitive, plastic material pattern may be deposited on the surface of cylinder 5.

Sleeve 1 may comprise a seamless elastic coating surrounding an inner support cylinder.

Figure 2:
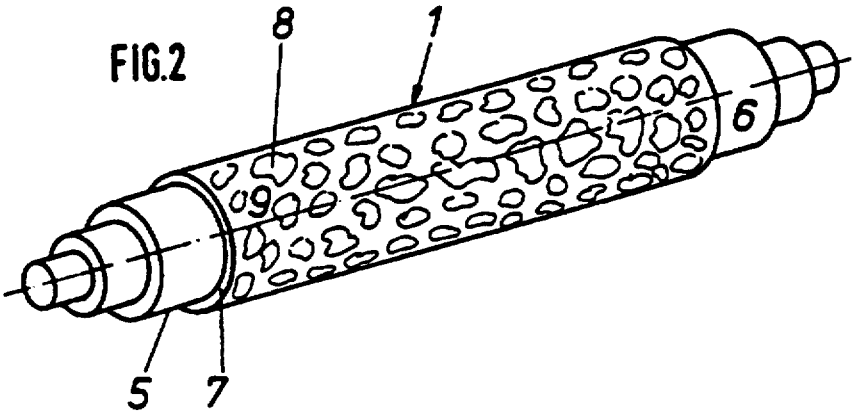
FIG. 2 shows a perspective view of a sleeve drawn onto a cylinder.
Figure 3:
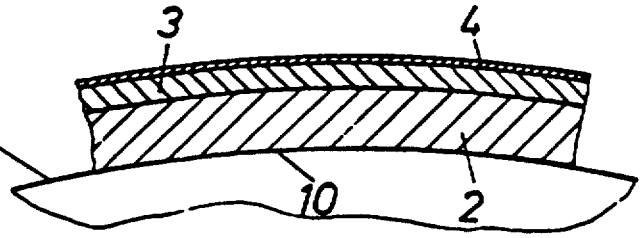
FIG. 3 shows an enlarged sectional view of the rough shape of a composite metal sleeve.
Figure 4:
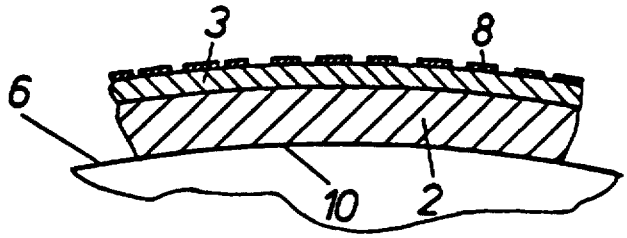
FIG. 4 shows an enlarged sectional view of a printing form of a composite metal sleeve.

In FIG. 2, the composite metal sleeve 1 is drawn onto the cylinder 5. The sleeve 1, which has a very thin wall 7, is frictionally attached to the surface 6 of the cylinder 5. The patterns 8 are mounted on the surface 9 of the sleeve 1 facing away from the cylinder 5. As shown in FIG. 3 sleeve 1 is attached fixedly by friction with its inner surface 10 facing the surface 6, so that it cannot be displaced during printing with respect to the surface 6. Preferably, the sleeve 1 is a metal composite. In this case, an intermediate metal 3 surrounds the outer surface of the support metal 2 facing away from the cylinder 5. A very thin layer of surface metal 4 is applied to the intermediate metal 3 and the pattern 8 (see also FIG. 4) is worked into the surface metal 4. Nickel or steel may be used as the support metal 2. Copper is usually chosen as the intermediate metal 3 and chromium is applied to it as the surface metal 4. Such single or composite metal forms are well suited for use in the offset printing process.

The sleeve 1 may be fastened in a number of ways to the surface 6 of the cylinder 5. For example, an air cushion 51 may lift the print form for mounting or upon uniform heating of the sleeve 1, it expands so that it may be pushed onto the surface 6 of the cylinder 5. During subsequent cooling the sleeve 1 contracts and thereby attaches itself firmly to the surface 6 and is held by frictional forces. Such a shrink fitting of the sleeve 1 is favorable because the patterns 8, particularly in the case of single metal forms, are applied by a sensitizing lacquer, burned into the surface 9 of the sleeve 1 at a temperature of approximately 200° C. During this burning of the sensitizing lacquer the sleeve 1 is heated to a temperature suitable for shrink fitting.

Figure 9:
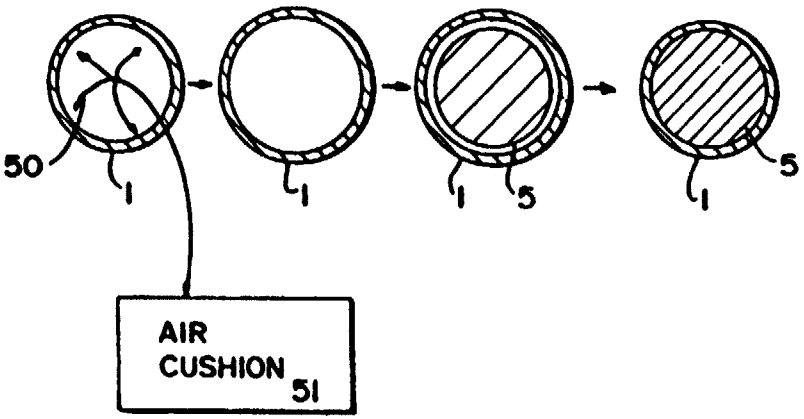
FIG. 9 shows various steps of attaching the sleeve to the cylinder.

Alternatively as shown in FIG. 9, sleeve 1 may be fastened to cylinder 5 by expanding sleeve 1 with pressure from a pressure medium 50. The sleeve is then moved over cylinder 5 and allowed to relax.

Figure 5:
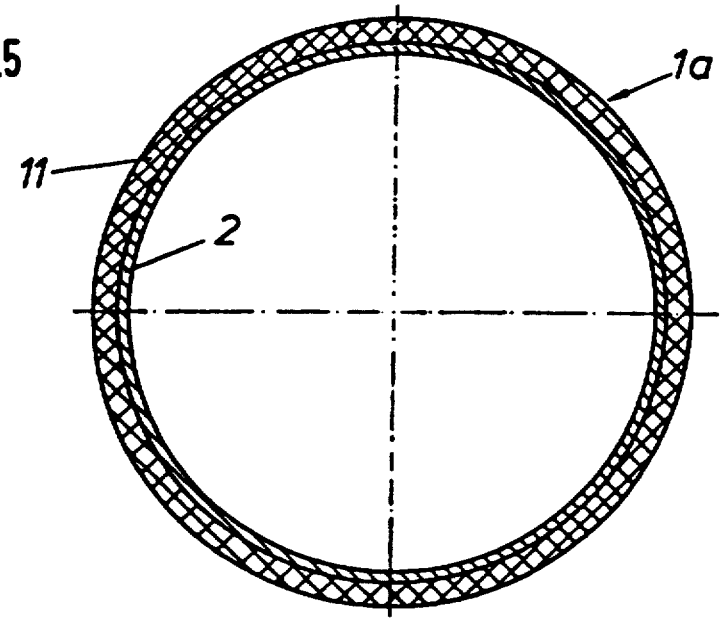
FIG. 5 shows a cross section through a sleeve coated with a layer of rubber.

FIG. 5 shows a sleeve 1a coated with a layer 11 of rubber in cross-section. The rubber layer 11 surrounds a support metal sleeve 2. The support metal sleeve 2 may be a metal tube with a thickness of about 0.3 min. The rubber cover 11 may be approximately 1 to 5 mm thick.

To change the sleeve 1, the cylinder 5 may either be removed completely from the stands 12, 13 or preferably remain in part within the stands 12, 13.

Figure 6:
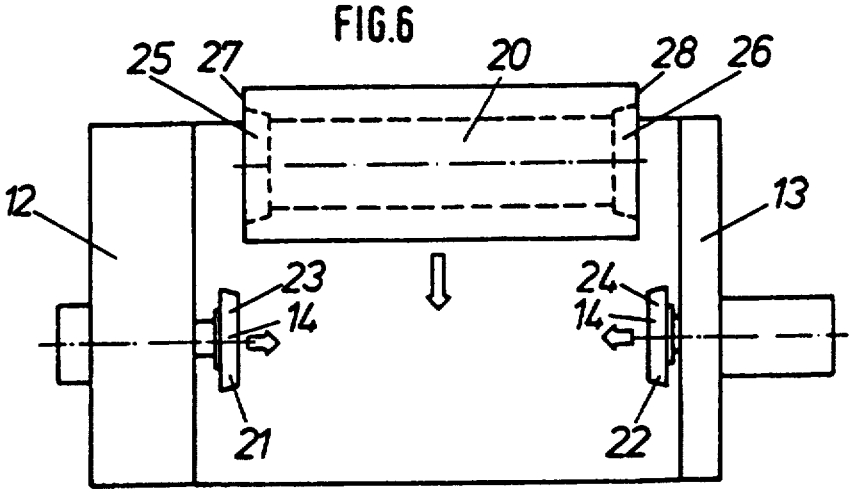
FIG. 6 shows a schematic view of a printing machine with the cylinder jacket removed.

FIG. 6 illustrates the cylinder in the form of a cylinder jacket 20 which may be removed from the stands 12, 13 by retraction on longitudinally displaceable bearings 21, 22. The bearings 21, 22 are supported in the stands 12, 13 so that they may be displaced longitudinally in the direction of the cylinder. They project with the pressure pieces 23, 24 of the cylinder jacket 20. The pressure pieces 23, 24 are positively guided in the recesses 25, 26.

To remove the cylinder jacket 20, the pressure pieces 23, 24 are moved in the direction of their adjacent stands 12, 13 and thereby withdrawn from the recesses 25, 26. The cylinder jacket 20 can now be removed from the stands 12, 13 and the sleeve may be replaced. The cylinder jacket 20 is then lowered between the stands 12, 13 to the bearings 14. Subsequently, the pressure pieces 23, 24 are moved in the direction of the cylinder jacket 20, until they positively engage the recesses 25, 26 and align them between the stands 12, 13 so that the accurate circular rotation of the cylinder jacket 20 is assured.

Figure 7:
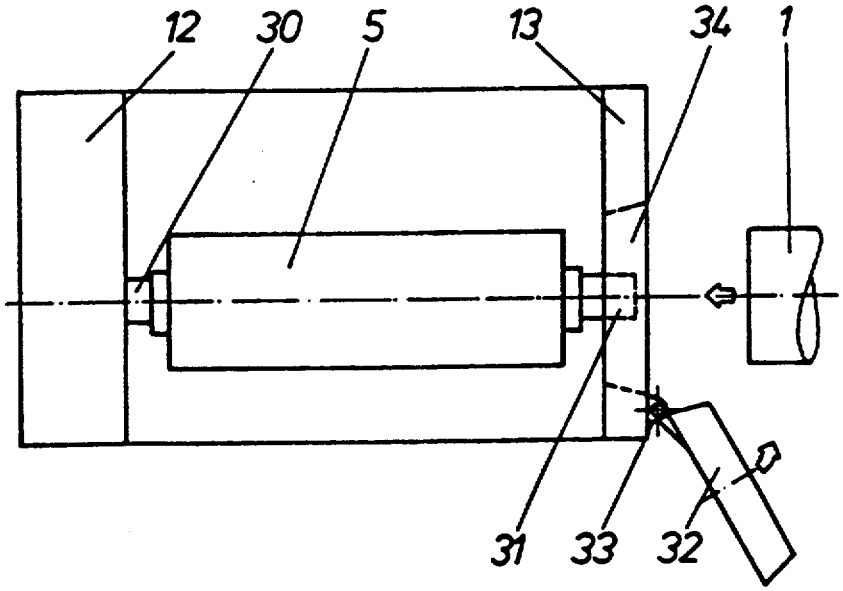
FIG. 7 shows a bearing that pivots away from the cylinder.

It is also possible to replace the sleeve 1 on a cylinder 5 without removal from the stands 12, 13 as illustrated in FIG. 7. The cylinder may be supported at one end 30 in a cantilever manner in the stand 12 and guided at its other end 31 in a pivoting bearing 32. This pivoting bearing 32 is supported by a pivot bearing 33 on the stand 13 and may be swivelled from the stand 13 to face away from the cylinder 5. Following the swiveling of the pivoting bearing 32, the stand 13 exhibits a recess 34 having a cross-section larger than the cross-section of the sleeve 1. The sleeve 1 may be drawn off the cylinder 1 and replaced through means of this recess 34. Following replacement of the sleeve 1, the pivoting bearing 32 is swivelled back in the direction of the cylinder 5, so that the end 31 of the cylinder 5 is guided within the pivoting bearing 32.

Figure 8:
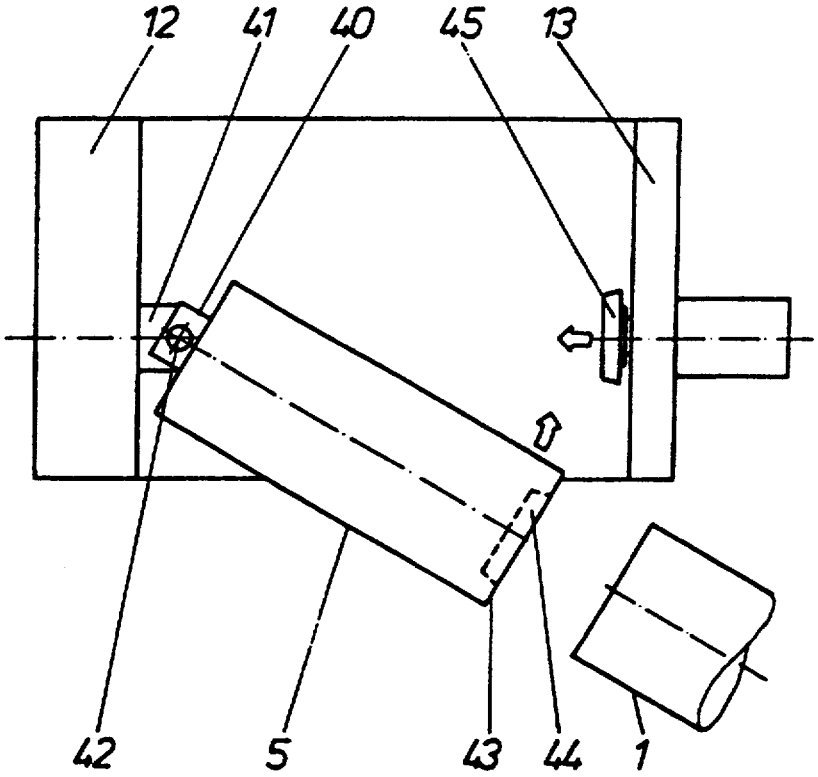
FIG. 8 shows a schematic view of a part of a printing machine with a cylinder that may be pivoted around one of its ends.

The embodiment illustrated in FIG. 8 provides for a pivoting attachment of the cylinder 5 at one of its ends 40 to a bearing 41. A pivot bearing 42 is provided between the bearing 41 and the end 40. The cylinder 5 may be swivelled transversely to its longitudinal axis around the pivot bearing 42. The cylinder 5 is equipped with a recess 44 at end 43 located opposite to the pivot bearing 42. A pressure piece 45, rotatingly supported in the stand 13, projects into recess 44. The pressure piece 45 is longitudinally displaceable relative to the cylinder 5. The pressure piece engages the recess 44 when the cylinder is in the printing position. The pressure piece 45 is displaced in the direction of the stand 13 to enable the cylinder 5 to swivel around the pivot bearing 42. The pressure piece is thereby moved out of the recess 44, so that the cylinder 5 is freely movable at its end 43 adjacent to the stand 13. The cylinder may be swivelled around the pivot bearing 42 until it protrudes out of the area of the stand 13. The sleeve 1 may then be pulled off the cylinder 5 and replaced. Following the replacement of the sleeve 1, the cylinder 5 is pivoted back into the printing position. In the printing position the pressure piece 45 may be displaced toward and locked into the recess 44 in the longitudinal direction. The cylinder and the new sleeve 1 is then ready for operation. The process of replacing the sleeves 1 has been described with reference to FIGS. 6 to 8 for the print form sleeve 1. The same process steps are applicable to the transfer sleeve 1a with a rubber cover 11, together with the same design principles.

I claim:

1. A method for offset printing comprising:

releasably mounting a sleeve-shaped print form to a cylindrical routing body, said sleeve-shaped print form comprising a first material layer for absorbing water and a second material layer for absorbing ink, by frictionally fitting and radially supporting an inner surface of said sleeve-shaped print form to an outer surface of said rotating body along a longitudinal extent of said print form;

contacting said sleeve-shaped print form with an ink; printing a carrier material with ink from said second material layer;

completing the printing of said carrier material;

unilaterally releasing a single end of said rotating body from a frame-mounted bearing;

removing said print form from said rotating body by axially pulling said print form past said end of said rotating body connected to a releasable bearing;

replacing said print form with a second sleeve-shaped print form by axially inserting said second print form over said end of said rotating body;

engaging said rotating body through said releasable bearing with said frame; and printing a carrier material.

2. A method according to claim 1, wherein the step of releasably mounting said sleeve-shaped form frictionally holds said form to said rotating body.

3. A method according to claim 1, wherein the fitting step comprises;

expanding an inner surface of said print form by exposing said inner surface to pressure of a medium pushing the expanded sleeve-shaped form over said rotating body; and releasing said pressure.

4. A method according to claim 1, wherein releasing comprises pivoting a rotating body mounting bearing away from said rotating body.

5. A method according to claim 1, wherein releasing comprises retracting a bearing mount axially from an end of said rotating body and pivoting said rotating body at a second end.

6. A method according to claim 1, wherein releasing comprises removing said rotating body from said frame.

7. An offset printing apparatus comprising:

a cylindrical rotating body bearingly supported in a frame;

a releasable bearing connected to said frame and supporting an end of said cylindrical rotating body;

a sleeve-shaped print form comprising a first water absorbing layer and a second ink retaining layer defining an ink transferring pattern deposited on an outer surface and a third support layer defining an inner support layer supporting said first and second layers, said sleeve-shaped form is mounted and radially supported on said cylindrical rotating body;

wherein said sleeve-shaped print form exhibits a low wall thickness relative to a diameter of said print form;

an ink transfer cylinder rotatingly mounted in said frame adjacent to said sleeve-shaped print form; and an inking unit and a wetting unit mounted on said frame, adjacent to said sleeve-shaped print form;

wherein said apparatus is configured to allow axial removal of said print form from said cylindrical rotating body without removal of said rotating body from said frame.

8. An apparatus according to claim 7, wherein said sleeve-shaped print form is configured as a plate cylinder.

9. An apparatus according to claim 7, wherein said sleeve-shaped print form is an image carrier and mounted on an offset cylinder.

10. An apparatus according to claim 7 wherein said third layer is about 0.3 mm thick.

11. An apparatus according to claim 7 wherein said first and/or second layers have been deposited on said third layer.

12. An apparatus according to claim 7, wherein said material defining said ink transferring pattern is metal.

13. An apparatus according to claim 7, wherein said material defining said ink transferring pattern is a plastic.

14. An apparatus according to claim 13, wherein said plastic is light sensitive.

15. An apparatus according to claim 7, further comprising an air cushion between said rotating body and said print form actuable for lifting said sleeve shaped print form for mounting.

16. An apparatus according to claim 7, further comprising a pivoting mount connected to said first end of said rotating body arranged in a recess in said frame exhibiting a clearance larger than a cross section of said sleeve shaped print form.

17. An apparatus according to claim 16, further comprising a fixed cantilever bearing support connected to a second end of said rotating body.

18. An apparatus according to claim 7, further comprising:

a longitudinally displaceable pressure piece connected to a first end of said rotating body; and a pivoting journal connected to a second end of said rotating body.

19. An apparatus according to claim 7, wherein said sleeve shaped print form comprises:

an inner support cylinder and a seamless elastic outer coating surrounding said inner support cylinder.

20. An apparatus according to claim 7, wherein said ink transfer cylinder comprises a seamless elastic coating surrounding a removable sleeve.

21. An offset printing apparatus comprising:

a frame;

a first stationary bearing connected to said frame;

a second releasable beating connected to said frame and releasably connected to said cylindrical rotating body;

a sleeve-shaped print form comprising at least a first water absorbing layer and a second ink retaining layer defining an ink transferring pattern deposited on an outer surface and a third support layer defining an inner support layer supporting said first and second layers, said sleeve-shaped form is mounted and radially supported on said cylindrical rotating body;

an ink transfer cylinder rotatingly mounted in said frame adjacent to said sleeve-shaped print form; and an inking unit and a wetting unit mounted on said frame, adjacent to said sleeve-shaped print form;

wherein said first and second bearings, said frame and said cylindrical rotating body are configured to allow axial installation and removal of said print form over said cylindrical rotating body with said cylindrical rotating body fixed to said first bearing and released from said second bearing.

22. An apparatus according to claim 21, wherein said first stationary beating is a pivot cantilever bearing means for retaining said cylindrical rotating body in a pivoted position.

23. An apparatus according to claim 21, wherein said first stationary bearing is a cantilever bearing and said second releasable bearing is a pivot bearing configured to release said cylindrical rotating body and pivot clear of a print form installation path.

*24. An offset printing apparatus comprising:*

*a frame;*

*a cylindrical rotating body supported in said frame;*

*a replaceable print form comprising at least a first water absorbing layer and a second ink retaining layer defining an ink transferring pattern deposited on an outer surface; said replaceable print form is mounted and radially supported on said cylindrical rotating body;*

*an ink transfer cylinder rotatingly mounted in said frame adjacent to said replaceable print form;*

*a first stationary support connected to said frame;*

*a second releasable support connected to said frame and releasably connected to said ink transfer cylinder;*

*a transfer sleeve mounted and radially supported on said ink transfer cylinder; and*

*an inking unit and a wetting unit mounted on said frame, adjacent to said replaceable print form;*

*wherein said first and second supports, said frame and said ink transfer cylinder are configured to allow axial installation and removal of said transfer sleeve over said ink transfer cylinder with said ink transfer cylinder fixed to said first support and released from said second support.*

*25. An apparatus according to claim 24 wherein said replaceable printing form is a sleeve-shaped print form.*

*26. An apparatus according to claim 24 wherein said transfer sleeve exhibits an outer rubber layer.*

*27. An apparatus according to claim 24, further comprising an air cushion between said transfer cylinder and said transfer sleeve actuable for lifting said transfer sleeve for mounting.*

* * * * *